United States Patent [19]

Howell et al.

[11] Patent Number: 4,686,090

[45] Date of Patent: Aug. 11, 1987

[54] DESULFURIZING OF REDUCING GAS STREAM USING A RECYCLE CALCIUM OXIDE SYSTEM

[75] Inventors: John L. Howell, North Huntingdon Township, Westmoreland County; Joseph E. McGreal, Jr., Penn Hills Township, Allegheny County; Edward J. Nemeth, Mt. Lebanon Township, Allegheny County; Stephen Waslo, Penn Hills Township, Allegheny County, all of Pa.; Jerome Feinman, Grand Junction, Colo.

[73] Assignee: United States Steel Corporation, Pittsburgh, Pa.

[21] Appl. No.: 454,750

[22] Filed: Dec. 30, 1982

[51] Int. Cl.$^4$ ............................ B01J 8/00; C01B 17/00
[52] U.S. Cl. ..................................... 423/244; 423/563; 423/635; 423/636
[58] Field of Search ............... 423/244 A, 244 R, 563, 423/635, 636

[56] References Cited

U.S. PATENT DOCUMENTS 3,917,795 11/1975 Pelczarski et al. ................... 423/168
4,102,989 7/1978 Wheelock .............................. 423/638
4,321,242 3/1982 Feinman et al. ...................... 423/244

FOREIGN PATENT DOCUMENTS 1183937 3/1970 United Kingdom ........... 423/244 A

Primary Examiner—Gregory A. Heller
Attorney, Agent, or Firm—William L. Krayer

[57] ABSTRACT

A process for producing a low-sulfur content hot reducing gas stream comprising (a) contacting a sulfur bearing hot reducing gas stream with a desulfurizing agent comprising a desulfurizing fixed bed of solid particles comprising calcium oxide to thereby produce a low-sulfur content hot reducing gas stream and a calcium sulfide composition, then (b) contacting said calcium sulfide composition with an oxidizing gas composed of $CO_2$, $H_2O$ and $O_2$ to thereby convert the sulfide of the composition to a regenerated calcium oxide, and sulfur dioxide and then (c) reusing the regenerated calcium oxide in step (a) to desulfurize a hot reducing gas, and further involving the improvement comprising avoiding the formation of calcium sulfate when regenerating said calcium sulfide composition by means of (a) a separate clean-up bed after the desulfurizing bed of step (a) to assure complete conversion of the calcium oxide to calcium sulfide in the desulfurizing bed, or (b) passing the oxidizing gas through the partially sulfided desulfurizing bed from a direction which minimizes the contact of any sulfur dioxide formed in the regeneration step with any unsulfided calcium oxide.

10 Claims, 4 Drawing Figures

DESULFURIZING OF REDUCING GAS STREAM USING A RECYCLE CALCIUM OXIDE SYSTEM

FIELD OF THE INVENTION

This invention relates to desulfurizing reducing gas streams by means of a recycle calcium oxide system.

BACKGROUND OF THE INVENTION

Desulfurization of hot fuel gas could lead to thermally efficient power generation in coal-based, combined-cycle systems and also has advantages for coal-based direct reduction of iron ore. Many hot-desulfurization processes use calcium oxide as the desulfurizing agent (cf. U.S. Pat. Nos. 3,276,203; 3,307,350 and 3,853,538). Dolomite is a preferred form of calcium oxide. It forms calcium sulfide by reaction with the hydrogen sulfide in the coal-derived gas. While calcium oxide is an effective gas-desulfurizing agent, the most commonly proposed method of regenerating calcium sulfide, reacting with $CO_2$ and $H_2O$ under slightly reducing conditions at pressures greater than about 50 psig and temperatures preferably about 1000° to 1200° F., and calcining the calcium carbonate formed in the regeneration to return it to the calcium oxide form, does not achieve complete removal of the sulfur from the material. Thus, continuous use of calcium oxide for gas desulfurization followed by regeneration results in successively less efficient regeneration until, after about 10 cycles, about 10 to 20 percent of the original desulfurizing capacity remains. Furthermore, the spent material must undergo expensive and complex treatment to bring it to a state suitable for disposal to avoid pollution of the air and ground water.

In our process, the regenerated calcium oxide has improved capacity for reaction with sulfur-bearing fuel gas and repeated regeneration of the sulfided calcium oxide by this process does not induce significant progressive loss of capacity. The regenerated calcium oxide can retain approximately 70 to 80 percent of its original sulfur-holding capacity, which makes it suitable for repeated cyclic use. U.S. Pat. No. 4,212,851, incorporated herein by reference, for a general description of this improved process. The preferred regeneration temperature range of 1800° to 2050° F. will cause some shrinkage and decrease in surface area, but the cycle time can be adjusted to compensate for any concomitant decrease in reactivity. When it is necessary to dispose of the calcium oxide (for example, because of an excessive accumulation of fly ash in the bed or because of excessive loss of reactivity or capacity), any residual sulfur after the completion of the final regeneration period will be in the form of calcium sulfate and pose no air or water pollution problems. This improved process operates at temperatures commonly used to desulfurize gases, such as fuel gas, so that no temperature swing between the gas-desulfurization step and the calcium oxide-regeneration step is necessary, thus avoiding delays and complexities in the sequencing of process steps.

One of the problems that may arise in any of the recycle calcium oxide processes is that undesirable side reactions occur which result in loss of calcium oxide desulfurization capacity. Thus, sulfating of the calcium oxide can occur in the upper portion of a fixed bed of calcium oxide if the upper portion of the bed is left unsaturated after the gas desulfurization step. This sulfate formation occurs because the remaining calcium oxide is available to react with the sulfur dioxide generated in the lower portion of the bed and residual oxygen in the regeneration gas. Also, if the upper portion of the bed is not completely regenerated, the coal-gasification gas passing through the bed during the next gas desulfurization period containing hydrogen, hydrogen sulfide, carbon monoxide, carbon dioxide, and water vapor will deposit the incoming sulfur in the completely regenerated lower portion of the bed and will pick up sulfur in the upper incompletely regenerated portion of the bed. Thus, the fuel gas will not be sufficiently low in hydrogen sulfide at the outset of the gas-desulfurization period.

Attempts to prevent this problem by making sure that the bed is completely sulfided in the desulfurization step allows undesirable hydrogen sulfide to remain in the gas stream because of insufficient contact time with the small amount of calcium oxide remaining in the bed.

SUMMARY OF THE INVENTION

The process of this invention involves a process for producing a low-sulfur content hot reducing gas stream comprising (a) contacting a sulfur bearing hot reducing gas stream with a desulfurizing agent comprising a desulfurizing bed of solid particles comprising calcium oxide to thereby produce a low-sulfur content hot reducing gas stream and a calcium sulfide composition, then (b) contacting said calcium sulfide composition with an oxidizing gas to thereby convert the sulfide of said composition to a regenerated calcium oxide, and sulfur dioxide and then (c) reusing the regenerated calcium oxide in step (a) to desulfurize a hot reducing gas, wherein the improvement comprises avoiding the formation of calcium sulfate when regenerating the calcium sulfide composition by means of (1) a separate clean-up bed after the desulfurizing bed of step (a) to assure complete conversion of the calcium oxide to calcium sulfide in the desulfurizing bed, or (2) passing the oxidizing gas through the partially sulfided desulfurizing bed from a direction which minimizes the contact of any sulfur dioxide formed in the regeneration step with any unsulfided calcium oxide. If a clean-up bed is used, it would capture any hydrogen sulfide or sulfur dioxide generated as a result of incomplete regeneration of the upper part of the bed. This clean-up bed would be regenerated when it showed signs of excessive leakage of hydrogen sulfide during the desulfurization step.

This process overcomes the problem of sulfating of the calcium oxide in the fixed bed recycle calcium oxide process, and also eliminates the problem of high peaks of hydrogen sulfide in the gas stream leaving the desulfurization process.

PREFERRED EMBODIMENTS

The calcium oxide of this invention is preferably in the form of dolomite or lime, with dolomite being most preferred.

The calcium oxide is preferably in a fixed bed wherein the calcium oxide particles have an average particle size less than about ½ inch, and preferably between about ¼ inch and about ½ inch.

Although dolomite in the calcined or noncalcined stage can be used for gas desulfurization, calcined dolomite is preferable because the gas desulfurization can be carried out at higher temperatures, the dolomite is more reactive, and no carbon dioxide is added to reducing gases.

The process of this invention requires only one process step to regenerate the dolomite for further hot desulfurization; whereas, the most commonly proposed process described in the background requires both a regeneration and calcination step.

Completely sulfided dolomite contains about 28.5 percent sulfur. During desulfurization of hot sulfur-laden fuel gas, the calcium component of dolomite is converted to calcium sulfide. This reaction is most efficiently conducted in the 1400° to 1900° F. temperature range. In the subject regeneration process, the sulfided dolomite is preferably reacted with a mixture of carbon dioxide, water vapor, and oxygen at a temperature between about 1800° F. and about 2050° F. to achieve up to 97 percent regeneration. Because of the presence of the oxidizing components and the conditions selected, the following chemical reactions can take place:

$$CaS + 4\ CO_2 \rightarrow CaSO_4 + 4\ CO \quad (1)$$

$$CaS + 4\ H_2O \rightarrow CaSO_4 + 4\ H_2 \quad (2)$$

$$CaS + 2\ O_2 \rightarrow CaSO_4 \quad (3)$$

However, the unoxidized CaS also present can react with the $CaSO_4$.

Thus, $$3\ CaSO_4 + CaS \rightarrow 4\ CaO + 4\ SO_2 \quad (4)$$

Therefore, reactions (1), (2), and (4) can take place simultaneously to give the net reaction $$CaS + 3 \begin{pmatrix} CO_2 \\ H_2O \end{pmatrix} \rightarrow CaO + 3 \begin{pmatrix} CO \\ H_2 \end{pmatrix} + SO_2 \quad (5)$$

The extent of reaction (5) is limited by the equilibrium ratio of product gases to reactant gases. If oxygen is also present in the reacting system, it will oxidize the carbon monoxide and hydrogen products and thereby favor increased concentrations of sulfur dioxide. However, it is important not to introduce oxygen in concentrations high enough to promote the conversion of calcium sulfide to calcium sulfate by reaction (3), as opposed to oxidation of carbon monoxide and hydrogen produced by reactions (1) and (2), thereby suppressing reactions (4) and (5). Excessive oxygen will also heat the dolomite to temperatures at which its sulfur-holding capacity and reactivity will be decreased by permanent loss of porosity and surface area.

A gas containing 1.0 to 3.0 percent oxygen and a carbon dioxide:water vapor mole ratio of 2 to 0.2 is able to effectively regenerate 6-inch, 12-inch, and 10-foot-deep fixed beds of sulfided ¼-by ⅜-inch dolomite.

The concentration of sulfur dioxide in the feed gas for autothermal catalytic conversion to sulfuric acid is preferably about 3.5 percent. In the preferred method of operating our process, 1.0 to 3.0 percent oxygen is introduced into the regeneration gas stream, having carbon dioxide to water vapor mole ratio of between about 0.15 and about 0.3. The water vapor in the gas after regeneration is condensed out, leaving a mixture of sulfur dioxide and carbon dioxide, wherein the concentration of sulfur dioxide in the dry effluent gas would be above about 5 percent. The oxygen concentration in the regeneration gases can be increased as desired to best achieve the results desired in this invention.

To maximize the concentration of sulfur dioxide and at the same time prolong the life of the dolomite, it is critical that the temperature of the dolomite during regeneration be at least about 1850° F., and that the exothermic reactions in the reaction zone moving through the dolomite bed during regeneration not increase the temperature of the dolomite above 2050° F. If the dolomite temperature during regeneration is lower than about 1850° F., residual gas in the lower portion of the bed upstream of the high-temperature reaction zone will become fixed as calcium sulfate. If the temperature in the reaction zone increases above about 2050° F., recrystallization and concomitant decrease in porosity and surface area will result in permanent loss of bed reactivity and capacity for sulfidation.

Figure 1:
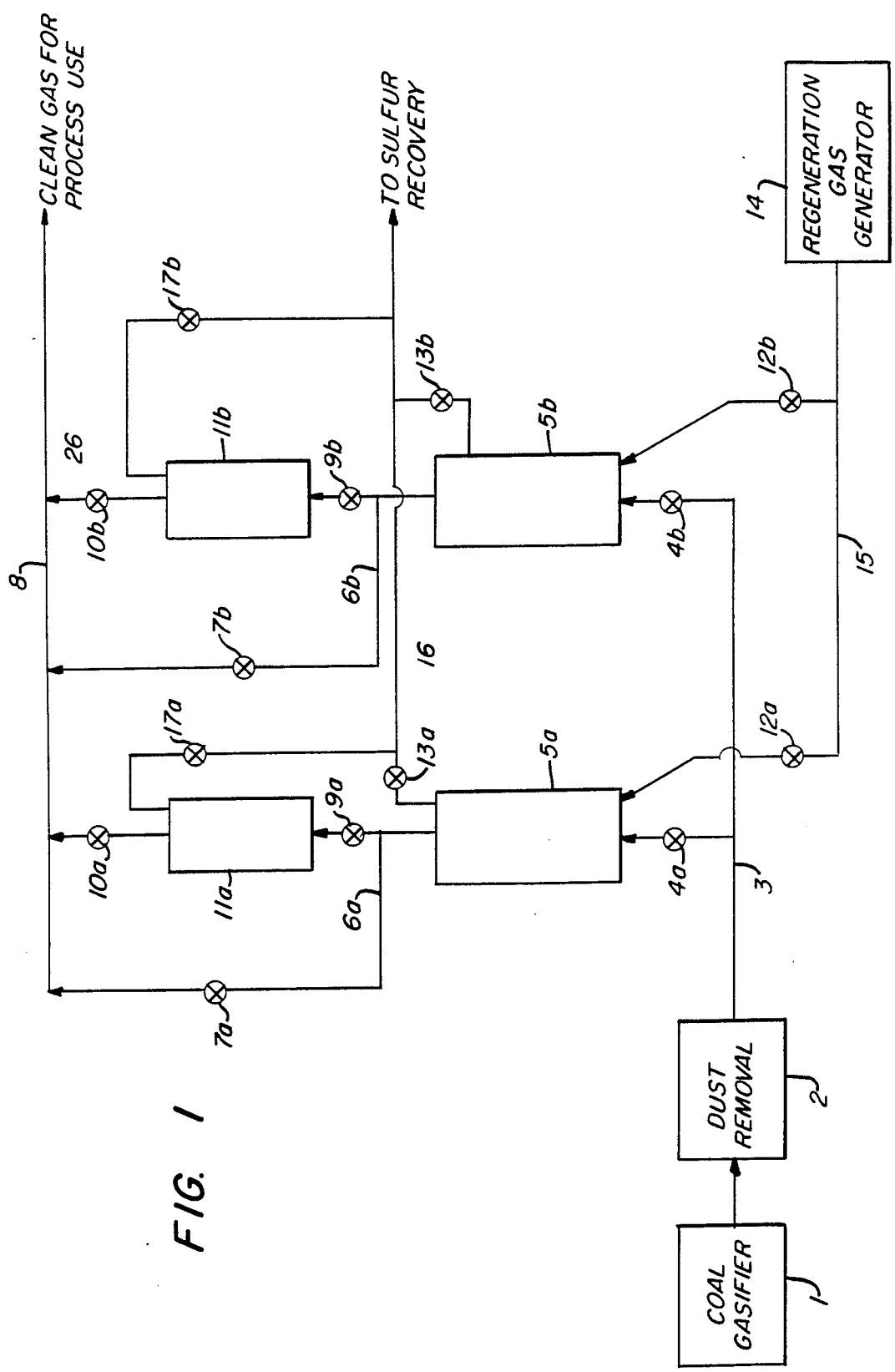
FIG. 1 is a flow diagram showing the process of this invention operating with a separate cleanup bed for each of two reactors in parallel.

In FIG. 1, hot coal-gasification gas from coal gasifier 1 at 1400° to 1900° F. passes through hot dust-removal system 2 where the entrained fly ash is removed to at least 1 grain/scf. Dust removal system 2 may comprise refractory-lined cyclones in series with granular bed filters. If the gasifer outlet temperature is higher than the desired 1400° to 1900° F., a radiant boiler section may be incorporated in the gasifier to provide the necessary cooling. The gas leaving dust-removal system 2 is conducted in refractory-lined conduit 3 through high-temperature valve 4a to reactor 5a filled with calcined dolomite. High-temperature valve 4b to reactor 5b also filled with calcined dolomite is closed. Initially, the hydrogen sulfide and carbonyl sulfide concentration in the coal-gasification gas will decrease as the gas passes through the calcined dolomite bed of reactor 5a to about 150 ppm with concomitant progressive sulfiding of the dolomite. The clean coal-gasification gas leaving reactor 5a is conducted in refractory-lined conduit 6a through high-temperature valve 7a and refractory-lined conduit 8, to the process for use as a fuel or reductant. During this period, high-temperature valves 9a and 10a would be closed, thereby isolating cleanup reactor 11a, also filled with calcined dolomite. As the gas desulfurization proceeds, and the calcined dolomite bed in reactor 5a becomes progressively more sulfided, the gas leaving reactor 5a will reach a point where the hydrogen sulfide and carbonyl sulfide will begin to increase (breakthrough). When this concentration exceeds a predetermined maximum (in the case that the gas is to be used for direct reduction of iron ore, the maximum concentration is 600 ppm), high-temperature valve 7a is closed and high-temperature valves 9a and 10a are opened to allow the gas leaving reactor 5a to pass through cleanup reactor 11a and then through refractory-lined conduit 8. When dolomite bed 5a is essentially completely sulfided, as evidenced by a small difference in hydrogen sulfide and carbonyl sulfide concentration between the inlet and outlet of reactor 5a, high-temperature valves 4a, 9a, and 10a are closed on the reactor 5a that is completely sulfided and high-temperature valves 4b and 7b are opened on reactor 5b that has been regenerated to begin a gas-desulfurization cycle with this second parallel system. At this time, high-temperature valves 12a and 13a on reactor 5a would be opened to permit regeneration gas from regeneration gas generator 14 to pass through reactor 5a by means of refractory-lined conduits 15 and 16 to regenerate the sulfided bed therein. The regeneration gas then goes to a sulfur-recovery system. During this time, high-temperature valves 12b and 13b on reactor 5b being sulfided are closed to isolate it from the regeneration gas system. Regeneration of reactor 5a is terminated when the $SO_2$ concentration in the regeneration gas decreases to about 2000 ppm.

After a number of cycles, cleanup reactor 11a will become sufficiently sulfided to prevent attainment of the maximum allowable $H_2S$ concentration. At this time, when reactor 5a is regenerated, high-temperature valves 9a and 10a are opened and high-temperature valve 13a is closed to allow regeneration gas from reactor 5a to pass through and regenerate reactor 11a. Alternatively, reactor 11a may be isolated to allow the spent bed to be discharged and a fresh bed introduced. Reactors 5a, 5b, 11a and 11b all have this feature to enable recharging with a fresh dolomite bed. Heating and calcining these fresh beds would be done by means of excess air-combustion systems, not shown for reason of simplicity.

Figure 2:
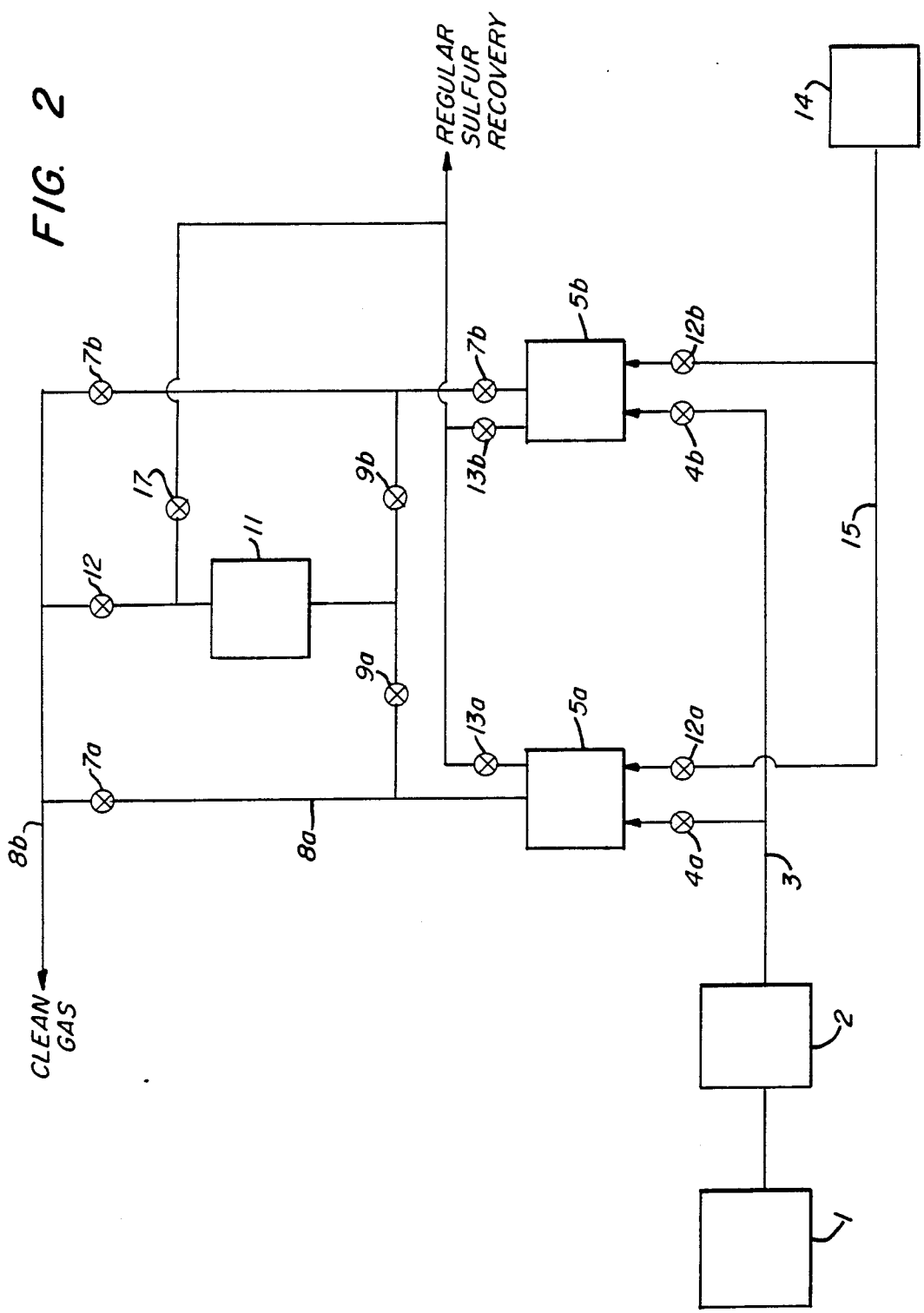
FIG. 2 is a flow diagram showing the process of this invention operating with one cleanup bed for two reactors in parallel.

Referring to FIG. 2, the cycling operation follows the same sequence as that described for FIG. 1, with the exception that since only one cleanup bed 11 is provided, it would not be possible to regenrate cleanup bed 11 and still maintain the cleanup feature for the reactor 5a desulfurizing the coal-gasification gas. In this flow diagram, it would, therefore, be necessary to discharge the spent bed and introduce a fresh bed.

Figure 3:
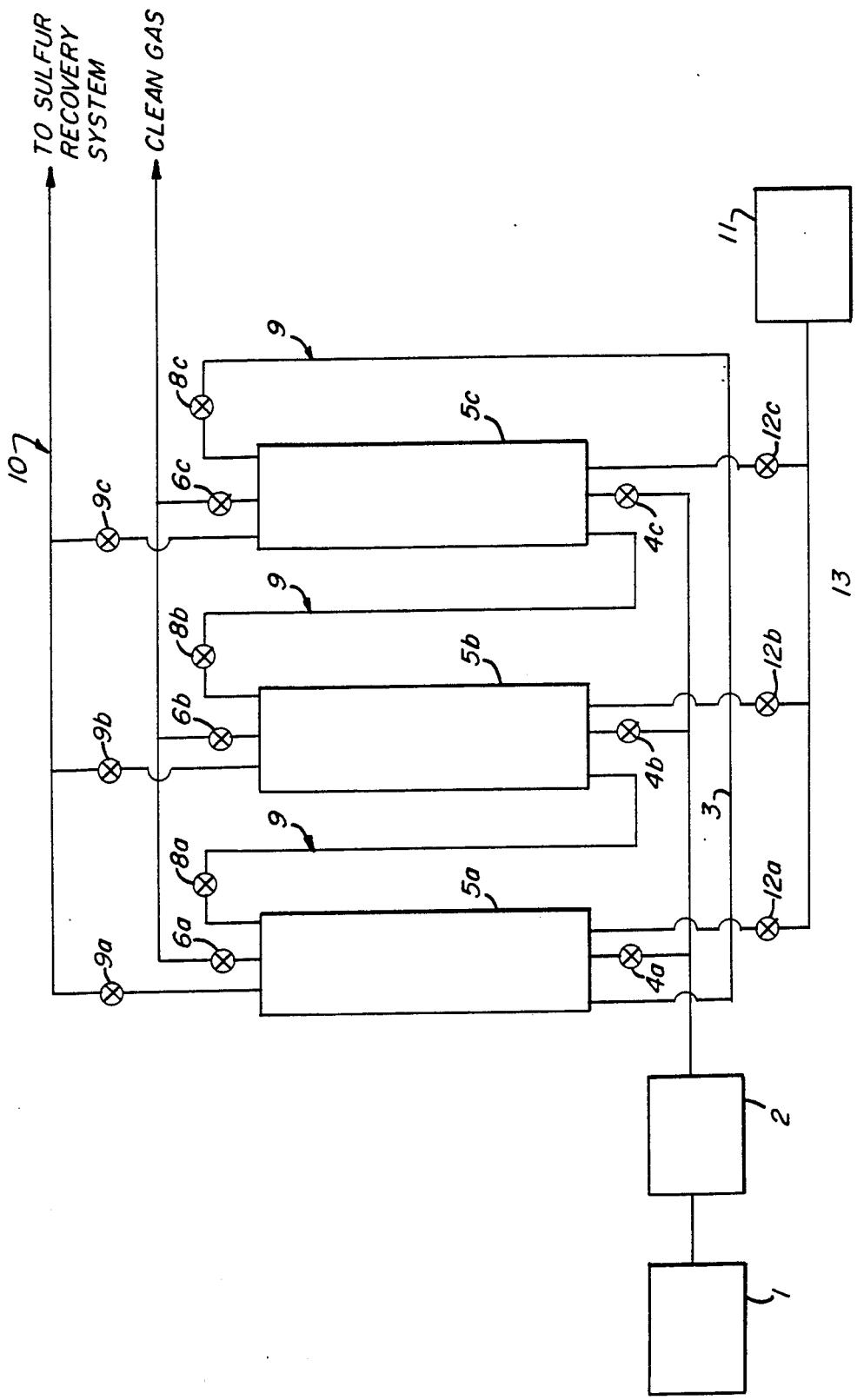
FIG. 3 is a flow diagram of the process using three reactors.

In FIG. 3, hot coal-gasfication gas from coal gasifier 1 at 1700° to 1900° F. passes through hot dust-removal system 2 and is conducted in refractory-lined conduit 3 through high-temperature valve 4a to reactor 5a filled with regenerated or fresh calcined dolomite. High-temperature valves 4b and 4c would be closed. The clean coal-gasification gas leaving reactor 5a, initially with about 150 ppm of sulfur-containing gases, is conducted in refractor-lined conduit 7 through high-temperature valve 6a to the process for use as a fuel or reductant. During this period, reactor 5b will be in the regenerated condition, and high-temperature valves 6b, 9b, 8b, and 12b would be closed; reactor 5c would be undergoing regeneration by means of gas from regeneration gas generator 11, which flows to it through refractory-lined conduit 13 and high-temperature valve 12c. Regeneration gas leaving reactor 5c flows through refractory-lined conduit 10 and high-temperature valve 9c to the sulfur-recovery system. High-temperature valves 6c and 8c would be closed. When the concentration of hydrogen sulfide and carbonyl sulfide in the gas leaving reactor 5a exceeds the predetermined maximum, high-temperature valve 6a is closed and high-temperature valves 8a and 6b are opened to allow reactor 5b to function as a cleanup bed. When dolomite bed 5a is essentially completely sulfided, as evidenced by a small difference in hydrogen sulfide and carbonyl sulfide concentration between the inlet and outlet of reactor 5a, high-temperature valves 4a and 8a are closed and high-temperature valve 4b is opened to allow reactor 5b to become the primary desulfurization bed. At this time, reactor 5c would be completely regenerated and high-temperature valves 12c and 9c would be closed to leave reactor 5c in condition to be the cleanup reactor for reactor 5b. High-temperature valves 12a and 9a would be opened at this time to admit regeneration gas from regeneration gas generator 11 to begin regeneration of reactor 5a. In this way, each bed would progress, in sequence, through the desulfurization, regeneration, and cleanup stages of the process.

Some important features of the subject process comprise:

(1) Limiting the dolomite temperatures during regeneration to between about 1800° and about 2050° F. and achieving acceptable sulfur dioxide concentrations in the dry effluent regeneration gas stream by means of high water-vapor concentration in the incoming regeneration gas. The water is condensed from the effluent gas stream, effecting a higher concentration of sulfur dioxide in the remaining gases.

(2) Achieving the desired range of regeneration temperature by controlling the inlet regeneration-gas temperature to at least about 1800° F. and maintaining the inlet oxygen concentration at less than about 3.0 percent.

(3) Achieving complete sulfidation of the desulfurization reactor with acceptable clean gas hydrogen sulfide plus carbonyl sulfide concentration by means of a cleanup bed in series with the desulfurization reactor or, alternatively using reverse flow of the incoming gases during the gas desulfurization and dolomite regeneration steps of the process, to ensure that the condition of the dolomite bed at the conclusion of one step will not promote undesirable side reactions at the start of the next step.

Figure 4:
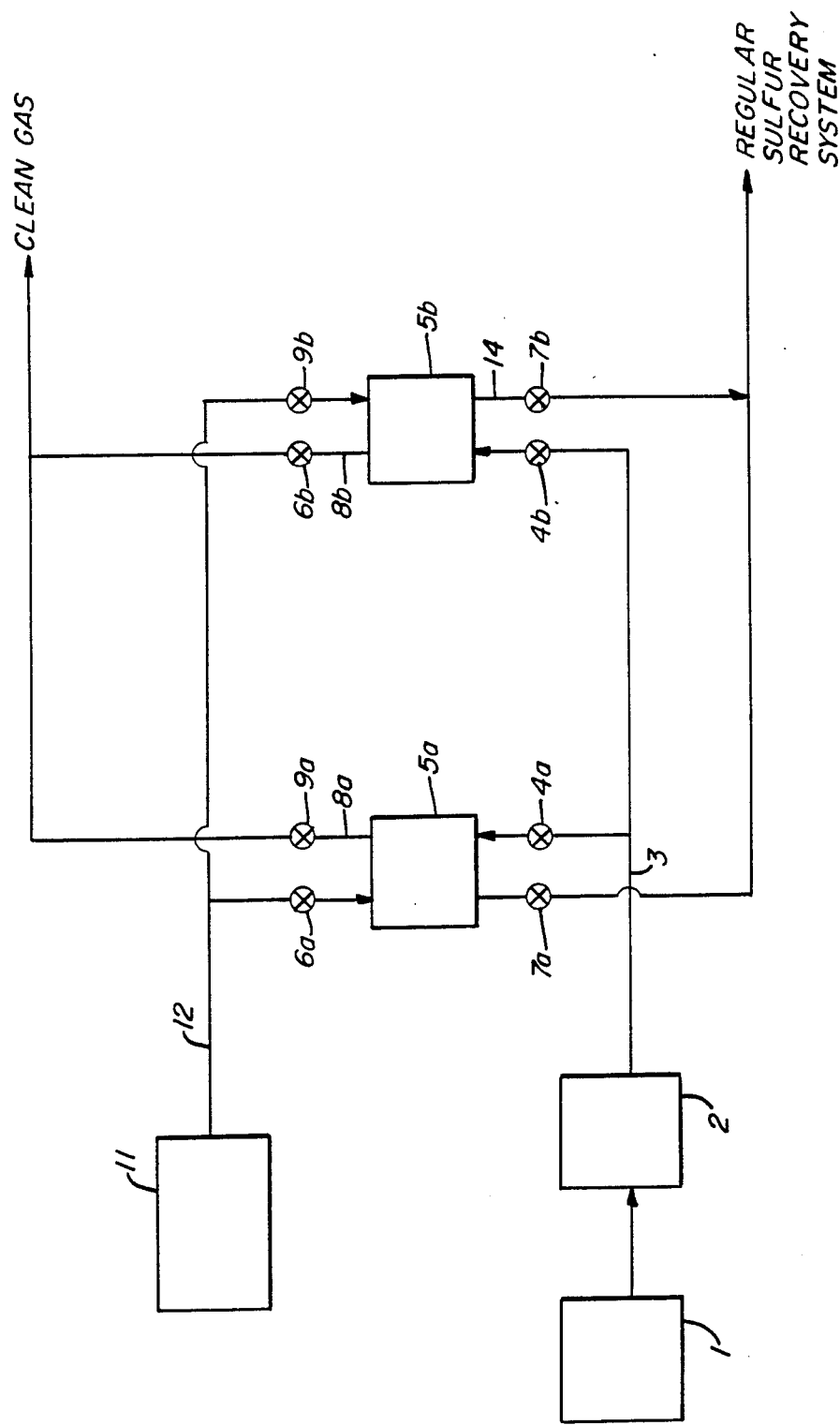
FIG. 4 is a flow diagram showing the process operating without a cleanup bed by having the gas regeneration gas coming into the reactor containing the sulfided dolomite at the opposite end of the reactor that the gas to be desulfurized enters during the desulfurizing phase.

In FIG. 4, hot coal-gasification gas from coal gasifier 1 at 1400° to 1900° F. passes through hot dust-removal system 2 and is conducted in refractory-lined conduit 3 through high-temperature valve 4a to reactor 5a filled with regenerated or fresh calcined dolomite. High-temperature valves 6a and 7a would be closed. The clean coal-gasification gas leaving reactor 5a, initially with about 150 ppm of sulfur-containing gases, is conducted in refractory-lined conduit 8 through high-temperature valve 9 to the process for use as a fuel or veductant. During this period, reactor 5b would be undergoing regeneration by means of gas from regeneration gas generator 11, which flows to it through refractory-lined conduit 12 and high-temperature valve 6b. Regeneration gas leaving reactor 5b flows through refractory-lined conduit 14 and high-temperature valve 7b to the sulfur-recovery system. High-temperature valves 4b and 9b would be closed. When the concentration of hydrogen sulfide and carbonyl sulfide in the gas leaving reactor 5a exceeds the predetermined maximum, high-temperature valves 4a and 9a are closed and high-temperature valves 6a and 7a are opened to allow reactor 5a to undergo regeneration. When dolomite bed reactor 5b is completely regenerated, high-temperature valves 6b and 7b would be closed and high-temperature valves 4b and 9b would be opened to allow desulfurization of sulfur-containing gases to take place. In this way, each bed would progress, in sequence, through the desulfurization and regeneration stages of the process.

Thus in FIG. 4 even though complete sulfidation is not attained in the dolomite bed reactor in the desulfurization phase, sulfate formation is avoided by having the regeneration gases pass through the end of the reactor such that the sulfur dioxide gas produced in the regeneration phase avoids contact and reaction with the unsulfided calcium oxide.

We claim:

1. In a process for producing a low-sulfur content hot reducing gas stream comprising (a) contacting a sulfur bearing hot reducing gas stream with a desulfurizing agent comprising a desulfurizing fixed bed of solid particles comprising calcium oxide to thereby produce as low-sulfur content hot reducing gas stream and a calcium sulfide composition, then (b) contacting said calcium sulfide composition with an oxidizing gas to thereby convert the sulfide of said composition to a regenerated calcium oxide, and sulfur dioxide and then (c) reusing the regenerated calcium oxide in step (a) to desulfurize a hot reducing gas, the improvement comprising avoiding the formation of calcium sulfate when regenerating said calcium sulfide composition by means of a separate clean-up fixed bed after the desulfurzing bed of step (a) to assure complete conversion of the calcium oxide to calcium sulfide in the desulfurizing bed.

2. Process as in claim 1 wherein said desulfurizing agent comprises calcined dolomite or calcined limestone.

3. Process as in claim 1 wherein said desulfurizing agent in step (a) has an average particle size of between about ¼ inch and about ½ inch.

4. Process as in claim 1 wherein the regeneration step (b) is conducted by reacting said calcium sulfide composition with a mixture of carbon dioxide, water vapor, and oxygen at a temperature between about 1800° F. and about 2050° F.

5. Process as in claim 1 wherein step (a) is conducted at a temperature between about 1400° F. and about 1900° F.

6. In a process for producing a low-sulfur content hot reducing gas stream comprising (a) contacting a sulfur bearing hot reducing gas stream with a desulfurizing agent comprising a desulfurizing fixed bed of solid particles comprising dolomite to thereby produce a low-sulfur content hot reducing gas stream and a sulfided dolomite composition, then (b) contacting said sulfided dolomite composition with an oxidizing gas to thereby convert the sulfide of said composition to a regenerated dolomite and sulfur dioxide, and the (c) reusing said regenerated dolomite in step (a) to desulfurize a hot reducing gas, the improvement comprising avoiding the formation of calcium sulfate when regenerating said sulfided dolomite composition by means of a separate clean-up fixed bed after the desulfurizing bed of step (a) to assure complete conversion of the dolomite to sulfided dolomite in the desulfurizing bed.

7. Process as in claim 6 wherein said dolomite comprises calcined dolomite.

8. Process as in claim 7 wherein said calcined dolomite in step (a) has an average particle size of between about ¼ inch and about ½ inch.

9. Process as in claim 6 wherein the regeneration step (b) is conducted by reacting said calcium sulfide composition with a mixture of carbon dioxide, water vapor, and oxygen at a temperature between about 1800° F. and about 2050° F.

10. Process as in claim 6 wherein step (a) is conducted at a temperature between about 1400° F. and about 1900° F.

* * * * *